Sept. 2, 1952     A. B. PIPPARD     2,609,505
AERIAL SYSTEM

Filed July 21, 1947     2 SHEETS—SHEET 1

A. B. PIPPARD.
*Inventor*

By *Nelson, Moore*
Attorney

Patented Sept. 2, 1952

2,609,505

UNITED STATES PATENT OFFICE 2,609,505

AERIAL SYSTEM

Alfred Brian Pippard, Cambridge, England

Application July 21, 1947, Serial No. 762,221
In Great Britain June 17, 1944

Section 1, Public Law 690, August 8, 1946
Patent expires June 17, 1964

25 Claims. (Cl. 250—33.65)

The present invention relates to aerial systems of the type in which radio frequency energy is fed to or from a reflecting mirror surface by means of a wave-guide or feeder terminating in a radiating or receiving element such as a dipole. Such systems are employed to radiate or receive energy of very short wave lengths of the order of a few centimetres or less and possess a narrow radiation pattern. It is frequently necessary to produce small periodical deflections of the direction of the main lobe of the polar diagram for scanning purposes, and it is an object of the present invention to provide a system which is particularly suitable for this purpose and in which the resulting swinging of the beam is not accompanied by a substantial deterioration of the radiation pattern.

A radiator in the form of an open-ended waveguide or dipole acts very much as if it were a point source of radiation, the wave-front of the radiation being approximatley spherical. If such a source is placed at the geometrical focus of a parabolic mirror the resulting beam from the mirror has a plane wave front, which is the required condition for a narrow polar diagram. However, if it is attempted to swing the beam by moving the source (the open end of the waveguide or the dipole) about the geometrical focus, a considerable deterioration of the radiation pattern is produced if the movement of the source exceeds a half wavelength of the radiation employed. This type of aberration is particularly severe if the focus of the mirror lies in or near the plane of the aperture and can be lessened but not eliminated by increasing the focal length relative to the area of the aperture. Thus as a source is moved backwards and forwards along a line at right angles to the axis and passing through the focus of a parabolic mirror to produce a scanning motion of the beam the resulting radiation pattern is good at the centre of the scan but deteriorates rapidly towards the edges.

If the parabolic mirror is replaced by a spherical mirror and the source is moved along a circle concentric with the center of curvature of the mirror and passing through or near the principal focus of the mirror the resulting radiation pattern is poorer than that obtained with a point source at the focus of a parabolic mirror, owing to the fact that a point source does not produce a plane wave-front from a spherical mirror, but on the other hand since the system is symmetrical there is no deterioration of the radiation pattern when the source is moved along the concentric circle. It can be shown geometrically that the aberration is least when the source is placed at (or moves on a circle passing through) a point on the axis of the mirror distant $R/2 - d/4$ from the pole, R being the radius of the mirror and $d$ the depth from the pole to the plane of the aperture. This point coincides with the focus of that paraboloid which is tangential to the spherical mirror at its pole and cuts the spherical mirror along a circle coinciding with the edge of its aperture. Even so, the aberration is still greater than that which exists with a parabolic mirror having a point source at its focus.

According to the present invention an aerial system for radio transmission or reception is provided comprising a spherical reflector, a radiating or receiving element for feeding energy to or receiving energy from said reflector, and means located between said radiating or receiving element and said reflector for so distorting the wavefront of radiation passing between the radiating and receiving element and the reflector that spherical radiation centred at the radiating or receiving element produces or is produced by a substantially plane wave-front in the beam leaving or incident upon the system.

In another aspect of the invention, an aerial system for radio transmission or reception comprises a spherical reflector, radiating or receiving element for feeding energy to or receiving energy from said reflector, and means comprising one or more masses of dielectric interposed between the radiating or receiving element and the reflector, said means being so shaped and disposed that spherical radiation centred at the radiating or receiving element produces or is produced by a substantially plane wavefront in the beam leaving or incident upon the system by virtue of the wavefront distortion introduced by said dielectric mass or masses. A dielectric mass in the form of a cap covering the radiating or receiving element may be provided, the thickness of which varies from point to point of the cap in accordance with the retardations required to be imposed on the parts of the total radiation passing through the various parts of the cap in order to introduce the desired distortion of the wavefront of the radiation.

By means of the invention a degree of directivity comparable with that obtained from a parabolic reflector is obtained while achieving the additional advantage that deterioration of the radiation pattern due to movement of the source is substantially eliminated, the directivity obtained at the extremes of a scanning movement being substantially as good as at the centre.

The invention will be more clearly understood from the following description given with reference to the accompanying drawings in which.

Figure 1:
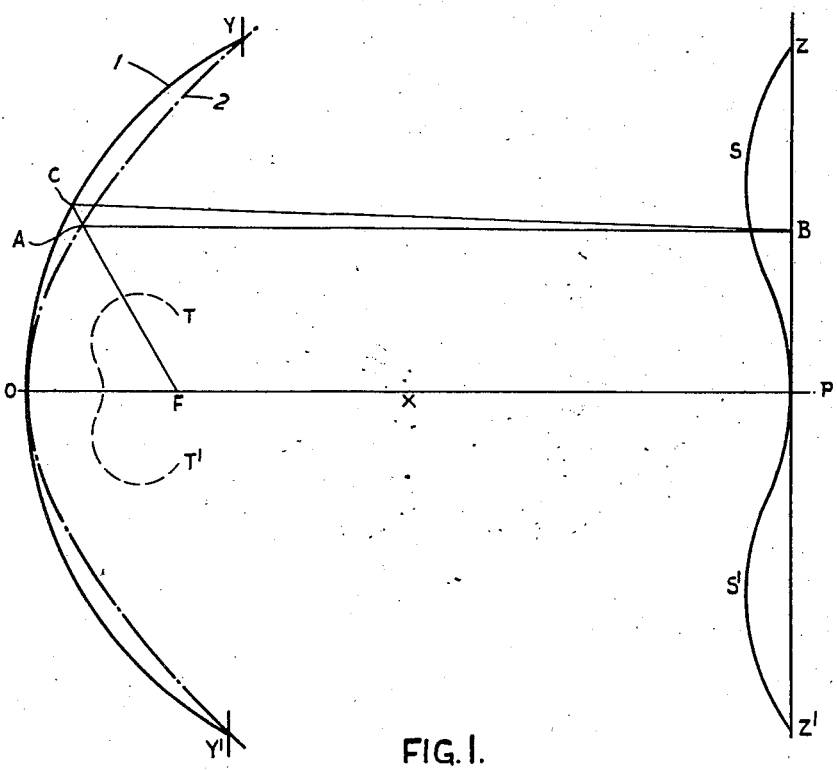
Figure 1 is a diagram serving to illustrate the theory underlying the invention.

Referring to Figure 1, a reflector 1 of spherical form has an axis OP and centre of curvature X. The chain-dotted curve 2 depicts the parabola which is tangential to the reflector at O and cuts the reflector at its aperture YY. The focus of parabola 2 is at F.

With a reflector conforming to the parabola 2 and a point source of radiation at F, an emergent beam having a plane wavefront ZZ' will result. A typical ray is FAB. If, now, the spherical reflector 1 is employed with the same source of radiation at F, the ray FCB is obtained. Obviously this ray has a greater pathlength than FAB so that the wave front produced by the spherical reflector will no longer be plane, i. e. the emergent beam will no longer be narrow, but a wavefront of the form depicted by the curve ZSPS'Z' will be obtained. In order to obtain a plane wavefront therefore, the rays striking the reflector, for example at O, Y and Y' must be retarded to an extent corresponding to the greatest difference in path length between the rays due to the spherical reflector and the corresponding rays due to the parabolic reflector. Intermediate rays require to be retarded by lesser amounts in accordance with the difference in path length already existing between the rays from the spherical reflector and the corresponding points on the parabolic reflector. Thus, if a plane wavefront such as ZZ' is assumed and corresponding rays are drawn for the spherical and parabolic reflectors passing through the focus F, a curve TT' can be constructed representing the differences in path lengths for all the rays striking the reflectors, the path length differences being added to a constant distance in the curve shown, in order to make the curve clearer.

From a curve such as the curve TT' constructed for any given spherical reflector in comparison with the corresponding parabola, the form of dielectric mass required to introduce the appropriate retardations may be reduced. Such a mass is shown in cross-section in Figure 2 in which the dielectric cap 3 covers the mouth of an open-ended, circular wave-guide 4 feeding a spherical mirror. It will be observed that the cap 3 has a hemispherical inner surface, while the outer surface is contoured so that the edges of the cap and its centre are thickest, these being the regions where the greatest retardation is required, while intermediately, where the necessary retardation is least, the cap is thinnest. The material employed may be, for example, a polystyrene. In this construction, the inner surface of the cap 3 is spaced from the end of the wave-guide 4 sufficiently to enable the radiation to settle down to a steady condition simulating that from a point source so that the wavefront incident on the inner surface of the cap is substantially spherical. The wavefront of the radiation after passage through the cap will, however, approximate to the shape of the curve TT' of Figure 1 so that after reflection from the spherical reflector a plane wavefront is obtained.

Figure 2:
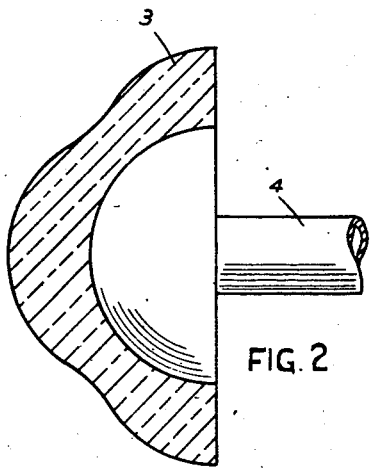
Figure 2 is a representation, partly in section, of a device for use in carrying out the invention.

A variation from the arrangement just described may also be employed, wherein the dielectric mass is formed as an approximately hemispherical continuation of a dielectric filling for the waveguide, the outer surface of the mass being contoured so that the wavefront of the radiation emergent from the mass approximates to that indicated by the curve TT' of Figure 2.

In practice it is not always possible to decide, on a theoretical basis, the correct form for any masses of dielectric material employed to modify the wavefront, as although the waves passing through the dielectric are retarded the effect is not fully predictable due to the closeness of the dielectric to the actual aperture of the guide and the results are anomalous. The correct form of the dielectric will then most easily be discovered by empirical methods.

Figure 3:
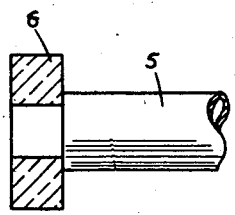
Figure 3 is a view, partly in section, of an alternative device to that depicted in Figure 2.

An example of a case in which the required form of a dielectric extension to a waveguide was discovered empirically by measurement of the actual wavefront produced, is shown in Figure 3 in which a circular waveguide 5 of 1⅜" diameter for use with a wavelength of 3.2 cms. is fitted with a collar 6 of solid dielectric to produce the proper wavefront to feed a spherical mirror of 5 foot radius and 5 foot aperture. The dimensions of the collar which is cemented directly on to the end of the waveguide are outside diameter 2⅓", inside diameter ⅞" and thickness 1".

Figure 4:
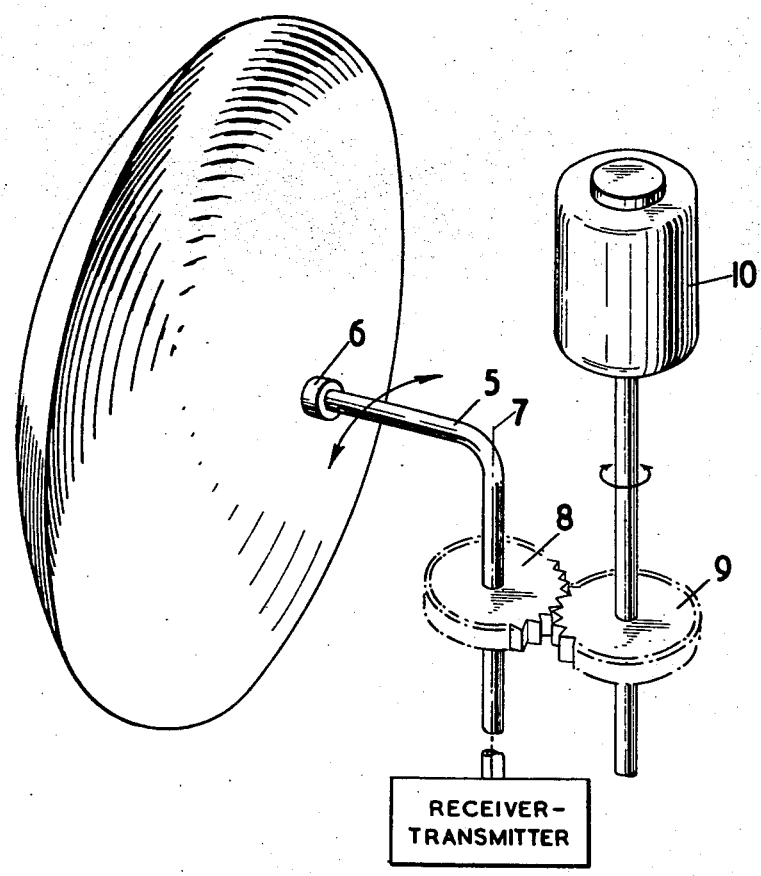
Figure 4 is a perspective view of one form of the invention.

In Figure 4 the waveguide 5 feeds the spherical reflector through the dielectric cap 6. The wave guide 5 is caused to rotate about axis 7 by gear wheel 8 which is driven by gear wheel 9 which is in turn driven back and forth a few angular degrees by motor 10.

For the best results the reflector should have circular cross-section in the plane of rotation of the antenna. The invention can be practiced with some impairment of the function and beneficial results if the cross-section departs somewhat from a perfect circle.

I claim:

1. An aerial system for collimating a radio beam and comprising a spherical reflector, a small antenna radiating element for radiating energy toward the inside surface of said reflector, and a dielectric block between said reflector and said element and contoured so that the thickness of said block is greater between said element and the peripheral zone of said reflector than between said element and a zone intermediate between the centre and the periphery of said reflector, the largest cross-section of the dielectric block as measured in planes perpendicular to the axis of the reflector being less than half of the cross-section of the reflector.

2. An aerial system for collimating a radio beam and comprising a spherical reflector, a small directional antenna radiating element which faces the inside surface of said reflector and which radiates solely in the direction of said reflector, and a contoured dielectric cap covering and rigidly attached to said element, the thickness of said cap being symmetrical about the axis of the reflector and varying from point to point in those planes which include the axis of symmetry, and the largest cross-section of the cap being less than half of the cross-section of the reflector.

3. An aerial system for collimating a radio beam comprising a spherical reflector, a wave guide feeding into said reflector, and a dielectric block rigidly attached directly on to the end of said wave guide, said block being symmetrical about the major axis of the wave guide and varying in thickness from point to point in those planes which include the axis of symmetry.

4. The system of claim 1 in which the portion of the dielectric block positioned between the radiating element and the centre of the reflector is greater than the thickness of the block in said intermediate zone.

5. An antenna system comprising a reflector having a spherical inner surface, a small radiating element facing said inner surface, and a dielectric mass positioned immediately adjacent said element and between the element and said reflector, the largest cross-section of said mass in any plane perpendicular to the axis of the reflector being a very small percentage of the cross-section of said inner surface and said mass being symmetrical about the axis of the reflector and varying in thickness from point to point in those planes which include the axis of symmetry, the thinnest portion of said mass as measured along the respective paths of radiations through the mass being in the path of those radiations which travel farther than they would have traveled had said inner surface conformed to that imaginary paraboloidal surface which has the same axis of revolution as the spherical reflector and which intersects the reflector at its axis of revolution as well as along the periphery of the reflector; said radiating element being positioned at substantially the point of focus of the paraboloidal surface hereinbefore defined.

6. An antenna system comprising a reflector element having a spherical inner surface, a small radiating element for radiating waves against said inner surface, and a dielectric mass interposed between the radiating element and reflector and immediately adjacent said radiating element, the cross-section of said mass in a plane perpendicular to the axis of the reflector being small as compared to the cross-section of said inner surface, the mass varying in thickness and having thicknesses along the various paths of radiation therethrough which vary in inverse proportion to the difference values between the length of the path from the radiating element to the reflector and thence to a given plane and the length of the path from the radiating element to an imaginary paraboloidal surface and thence to said given plane, said imaginary surface being tangent to the spherical surface at the axis of the latter and intersecting the periphery of the spherical surface, and said given plane being perpendicular to said axis and remote from and facing said inner surface; the radiating element being located substantially at the focus of said imaginary paraboloidal surface.

7. The antenna system defined in claim 6 including in addition, means for fixing the relative position of the radiating element and the mass, and means for moving the radiating element relative to the reflector element consisting of means rotatable about the center of curvature of the spherical inner surface and carrying one of said elements.

8. An antenna system comprising a reflector having a spherical inner surface, a wave guide having an output opening and directing radio waves at said surface, said spherical inner surface having an axis colinear with the major axis of the output opening of said wave guide, a dielectric mass having a substantially spherical inner surface with the center of curvature thereof substantially coincident with the center of the opening of the wave guide, said last-named spherical surface being adjacent said opening and spaced therefrom sufficiently to enable the radiations from said opening to settle down to a steady condition simulating radiations from a point source so that the wavefront incident on the last-named inner surface is substantially spherical, the thickness of the mass as measured along lines passing through the center of said spherical surface varying gradually with the thicker portions of said mass in the paths of those radiations passing from the wave guide to the peripheral zone of the reflector and between the waveguide and the center of the reflector, said mass having a small cross-section as measured in planes perpendicular to said axis as compared to the area of said reflector; the center point of the output end of the wave guide being positioned on said axis and having its shortest distance from the inner surface of the reflector equal to $R/2-d/4$ where R is the radius of the inner surface of the reflector and $d$ is the distance from that point on the inner surface of the reflector which is intersected by said axis to the plane of the aperture of the reflector.

9. An antenna system comprising a spherical reflector element, a wave guide radiating element having an outlet end facing the inner surface of said reflector, said wave guide having the axis of its outlet end coinciding with the axis of the reflector and having said outlet end spaced from the point where said axis intersects said reflector by a distance equal to $R/2-d/4$ where R is the radius of curvature of said inner surface and $d$ is the distance from that point where said axis intersects said inner surface to the plane of the aperture of the reflector, radiation pattern modifying means positioned in front of the outlet end of the wave guide for modifying the radiations from said wave guide to said inner surface to effect a planar wave output from the reflector, means for fixing the relative position of the output end of the waveguide and of said radiation pattern modifying means, and means for moving the reflector relative to the output end of the wave guide; said last-named means including means rotatable about the center of curvature of the spherical surface and carrying one of said elements.

10. An antenna system comprising a reflector the inner reflecting surface of which presents in one plane an inner reflecting contour substantially identical with the arc of a circle whose center is in said plane, a small radiating element located in said plane and at a distance from said inner surface which is less than half the radius of said circle, a dielectric mass positioned immediately adjacent said element and between the element and said reflecting surface, the largest cross-section of said mass in any plane perpendicular to the first-named plane being small as compared to the area of the reflecting surface, said mass varying in thickness in said first-named plane and having thicknesses along the various paths of radiation that pass through said mass in said first plane which vary in inverse proportion to the difference values between the length of path from the radiating element to the reflector and thence to a third plane and the length of the path from the radiating element to an imaginary parabolic curved surface and thence to said third plane, said imaginary surface being tangent to the arc of the reflecting surface at the point on said arc closest to said radiating element and intersecting said arc at the extremities thereof, and said third plane being perpendicular to the first-named plane and spaced from said reflector.

11. An antenna system as defined in claim 10 including means mounting said radiating element for movement to enable its radiations to be selectively directed primarily against different portions of said arc.

12. An antenna system as defined in claim 11 in which the last-named means mounts said radiating element for rotation in said first plane about a center coincident with the center of curvature of said arc.

13. An antenna system as defined in claim 12 in which the largest cross-section of said mass in a plane perpendicular to said first plane is less than one percent of the area of the inner surface of the reflector.

14. An antenna system as defined in claim 10 in which the cross-section of said mass in a plane perpendicular to said first plane is less than one percent of the area of the inner surface of the reflector.

15. An antenna system as defined in claim 10 in which said radiating element is positioned substantially at the focus of said parabolic surface.

16. An antenna system comprising a reflector element having an inner surface which presents in one plane an inner reflecting contour substantially identical with the arc of a circle whose center is in said plane, a small directional radiating element including means for radiating energy in said plane toward said inner surface, and a dielectric mass positioned immediately adjacent said element and between the element and said reflector, the largest cross-section of said mass in any plane perpendicular to the first-named plane being a small percentage of the area of said inner surface, said mass varying in thickness for the different radiating paths that pass through said first plane, the thinnest portion of said mass as measured in said first plane being in the path of those radiations which travel further than they would have traveled had the part of the inner surface which intersects the first plane conformed to that parabolic curve which intersects said arc at the extremities of the latter as well as mid-way between said extremities.

17. An antenna system as defined in claim 16 in which said radiating element is positioned at the focus of said parabolic curve.

18. An antenna system as defined in claim 17 including supporting means for the reflector element and the radiating element and for moving one thereof relative to the other to change the direction of the reflected waves.

19. An antenna system as defined in claim 18 in which the supporting means includes means for rotating said radiating element in said first-named plane about the center of curvature of said arc.

20. An antenna system comprising a reflector the inner reflecting surface of which has the shape of an arc of a circle in one plane, a small antenna for radiating energy toward said reflecting surface, and a dielectric block between said antenna and said surface and contoured so that the thickness of the block is greater between the antenna and a point mid-way along the length of the arc than between said antenna and a zone located between said point and an extremity of the arc, the largest cross-section of the block as measured in a plane perpendicular to the first-named plane being less than half the area of said inner surface.

21. An antenna system as defined in claim 20 in which the largest cross-section of the block as measured in a plane perpendicular to the first-named plane is a small percentage of the area of said inner surface.

22. An antenna system as defined in claim 20 in which said antenna is located on a radius of said arc and spaced from the surface by a distance less than half of said radius.

23. An antenna system as defined in claim 20 in which said antenna is a highly directional one and includes movable supporting means therefor enabling its radiations to be directed at different portions of said arc.

24. An antenna system as defined in claim 23 in which said supporting means is rotatable about the center of curvature of said arc.

25. An antenna system comprising a reflector the inner reflecting surface of which has the shape of an arc of a circle in one plane, a wave guide feeding into said reflector, and a dielectric block positioned adjacent the end of the wave guide and between it and the reflecting surface, said block being symmetrical about the major axis of the wave guide and varying in thickness from point to point in those planes which include the axis of symmetry.

ALFRED BRIAN PIPPARD.

REFERENCES CITED

The following references are of record in the file of this patent:

UNITED STATES PATENTS

| Number | Name | Date |
| --- | --- | --- |
| 1,081,215 | Coulson | Dec. 9, 1913 |
| 1,348,617 | Zorger | Aug. 3, 1920 |
| 2,112,411 | Schaffner | Mar. 29, 1938 |
| 2,170,979 | Straubel | Aug. 29, 1939 |
| 2,283,935 | King | May 26, 1942 |
| 2,422,579 | McClellan | June 17, 1947 |
| 2,429,601 | Biskeborn et al. | Oct. 28, 1947 |
| 2,486,620 | Van Atta | Nov. 1, 1949 |